(12) United States Patent
Van Der Knaap et al.

(10) Patent No.: US 8,967,644 B2
(45) Date of Patent: Mar. 3, 2015

(54) SUPPORT STRUCTURE FOR A VEHICLE WHEEL SUSPENSION

(75) Inventors: Albertus Clemens Maria Van Der Knaap, Eindhoven (NL); Jasper Joshua Backx, Eindhoven (NL)

(73) Assignee: Daf Trucks N.V., Eindhoven (NL)

( * ) Notice: Subject to any disclaimer, the term of this patent is extended or adjusted under 35 U.S.C. 154(b) by 0 days.

(21) Appl. No.: 14/000,089

(22) PCT Filed: Feb. 16, 2012

(86) PCT No.: PCT/NL2012/050083
§ 371 (c)(1),
(2), (4) Date: Oct. 7, 2013

(87) PCT Pub. No.: WO2012/112041
PCT Pub. Date: Aug. 23, 2012

(65) Prior Publication Data
US 2014/0062047 A1  Mar. 6, 2014

(30) Foreign Application Priority Data
Feb. 17, 2011 (NL) .................................... 2006224

(51) Int. Cl.
*B62D 21/11* (2006.01)
*B62D 21/02* (2006.01)
(52) U.S. Cl.
CPC .............. *B62D 21/11* (2013.01); *B62D 21/02* (2013.01)
USPC ............................. 280/124.109; 280/124.116
(58) Field of Classification Search
USPC ............. 280/124.109, 124.11, 124.116, 81.1; 180/24.01
See application file for complete search history.

(56) References Cited

U.S. PATENT DOCUMENTS

| 4,129,394 A | 12/1978 | Eichinger et al. |
| 5,846,014 A | 12/1998 | Arthur et al. |
| 6,719,476 B2 | 4/2004 | Hisi |
| 8,342,565 B2 * | 1/2013 | Hata ............................. 280/680 |
| 8,567,801 B2 * | 10/2013 | Buschjohann et al. 280/124.109 |
| 2003/0047906 A1 * | 3/2003 | Hicks et al. .................... 280/433 |
| 2004/0021290 A1 | 2/2004 | Hicks et al. |
| 2011/0148065 A1 | 6/2011 | Hata |
| 2013/0093154 A1 * | 4/2013 | Cordier et al. ......... 280/124.109 |
| 2013/0175780 A1 * | 7/2013 | Eickmann et al. ..... 280/124.109 |

FOREIGN PATENT DOCUMENTS

| JP | 11310151 | 11/1999 |
| WO | 2010/023843 A1 | 3/2010 |

OTHER PUBLICATIONS

International Search Report—PCT/NL2012/050083—mailing date: Apr. 26, 2012.

* cited by examiner

*Primary Examiner* — Drew Brown
(74) *Attorney, Agent, or Firm* — Banner & Witcoff, Ltd.

(57) ABSTRACT

A support assembly for receiving a vehicle wheel suspension and adapted for mounting to a vehicle structure, is disclosed that includes: a transverse body (3, 203, 303) having opposite ends; a left hand anchoring strut (9, 209, 309) extending downwardly from the transverse body (3, 203, 303) to define a distal left hand lower end; a right hand anchoring strut (7, 207, 307) extending downwardly from the transverse body (3, 203, 303) to define a distal right hand lower end. Separately attached left hand and right hand external reinforcing elements (31, 33; 231, 233, 333) each extend from an adjacent one of the opposite ends of the transverse body (3, 203, 303) to a connecting area (35, 37; 235, 335, 337) adjacent the respective one of the left and right hand distal lower ends of the downwardly extending anchoring struts (7, 9; 207, 209, 307, 309).

22 Claims, 10 Drawing Sheets

SUPPORT STRUCTURE FOR A VEHICLE WHEEL SUSPENSION

CROSS-REFERENCE TO RELATED APPLICATIONS

This application is a U.S. National Stage application under 35 U.S.C. §371 of International Application PCT/NL2012/050083 (published as WO 2012/112041 A1), filed Feb. 16, 2012, which claims priority to Application NL 2006224, filed Feb. 17, 2011. Benefit of the filing date of each of these prior applications is hereby claimed. Each of these prior applications is hereby incorporated by reference in its entirety.

The invention relates to a support structure for inclusion in a vehicle structure for receiving wheel suspension means. More in particular the invention relates to such a support structure that combines a cross brace between left and right hand longitudinal frame rails of a vehicular chassis frame with mounting facilities for wheel and axle suspensions. The invention also relates to a tractor vehicle for towing semi-trailers or non-articulated trucks including the support assembly.

A support structure of this kind is known from Japanese published patent application JP-A 11-310151 and uses an integrally formed cross member and a pair of separate suspension trunnion brackets. The suspension trunnion brackets are separately bolted to flange portions on the lower side of the integrally formed cross member. Although this structure has the advantage that it can be preassembled and mounted between the longerons of a vehicle frame as a unit, it may lack in stability and structural integrity over the conventional use of suspension trunnion brackets that are separately attached to the chassis longerons. Another concern with the known arrangements is their contribution to vehicle weight, which reduces the available payload and also adds to the environmental implications of fuel consumption. In view of environmental issues and considerations of energy preservation, reducing weight of structural vehicle components has gained more importance then it has ever had. Traditionally, automotive components have been designed using dimensional constraints and material properties together with relatively simple calculations and empirical knowledge. This procedure together with ample use of safety margins has not always resulted in the lightest weight and strongest components for the particular purpose. Modern computer based engineering has allowed to handle complicated calculation and generation of models that make optimal use of the dimensional constraints.

Nonetheless the computer generated models have often been found impossible to manufacture by the available mechanical processes. Accordingly a need has been recognised to properly combine the traditional design techniques with those offered by computer based engineering.

Published international patent application WO 2010/023843 discloses a support assembly for receiving a vehicle wheel suspension for a truck or tractor, which includes a cross member with integrated left hand and right hand trunnion brackets. Lower ends of the trunnion brackets have mounts for coupling suspension linkage rods. In this known support assembly individual trunnion shafts are mounted to bosses on the left and right trunion brackets and protrude outwardly in a transverse direction of the vehicle to rotatably support a leaf spring. Additional fore and aft reinforcing plates connect each of the bosses to an outside web of its adjacent chassis frame member. These additional front and rear reinforcing plates assist in compensating the lack of an interconnection between the individual trunnion shafts between the left and right trunnion brackets in the vehicle width direction. A conventional anchoring strut for merely coupling suspension linkage rods does not support a trunnion shaft from a boss. Hence there would be no teaching by this prior art to add reinforcement plates, when there is no vertical load from a leaf spring to be supported by the trunnion bracket.

Accordingly it is an object of the present invention to propose an improved support assembly for receiving a vehicle wheel suspension and tractor vehicle for towing semi-trailers including the support assembly. In a more general sense it is thus an object of the invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful alternative.

To this end the invention provides a support assembly for receiving a vehicle wheel suspension and tractor or truck including the support assembly in accordance with one or more of the appended claims. The support assembly according to the invention offers integrated mounting facilities for all wheel suspension guiding linkages, radius rods and anti-roll provisions. This results in a significant reduction of assembly time and errors in production. It also enables direct mounting of a fifth wheel trailer coupling. A further weight saving is notably achieved by the strategic use of an integrally formed element that is formed as one of a unitary forging, a unitary casting, a unitary moulding and a unitary sintered component, and separately attached left and right hand reinforcing elements of high strength sheet metal. The high strength sheet metal reinforcements each extend from an outside of an adjacent chassis beam to a connecting area on an adjacent downwardly extending anchoring strut in the vicinity of a distal lower end of the respective strut. This results in a weight saving of up to about 25% with respect to an integrally formed support structure, without the benefit of reinforcing elements. The reinforcing elements transmit the forces acting on the anchoring struts directly into the chassis. It is thereby further possible to integrate a fifth wheel mounting rail into the reinforcing elements. Fifth wheel loads can be very high and complimentary measures are desirable to transfer these loads not only to the chassis, but also to the wheel suspension. Such external reinforcing elements can also be topologically optimized and may have an open space frame structure to avoid buckling.

Further advantageous aspects of the invention will become clear from the appended description of preferred embodiments, which will now be described in reference to the accompanying drawings, in which.

Figure 1:
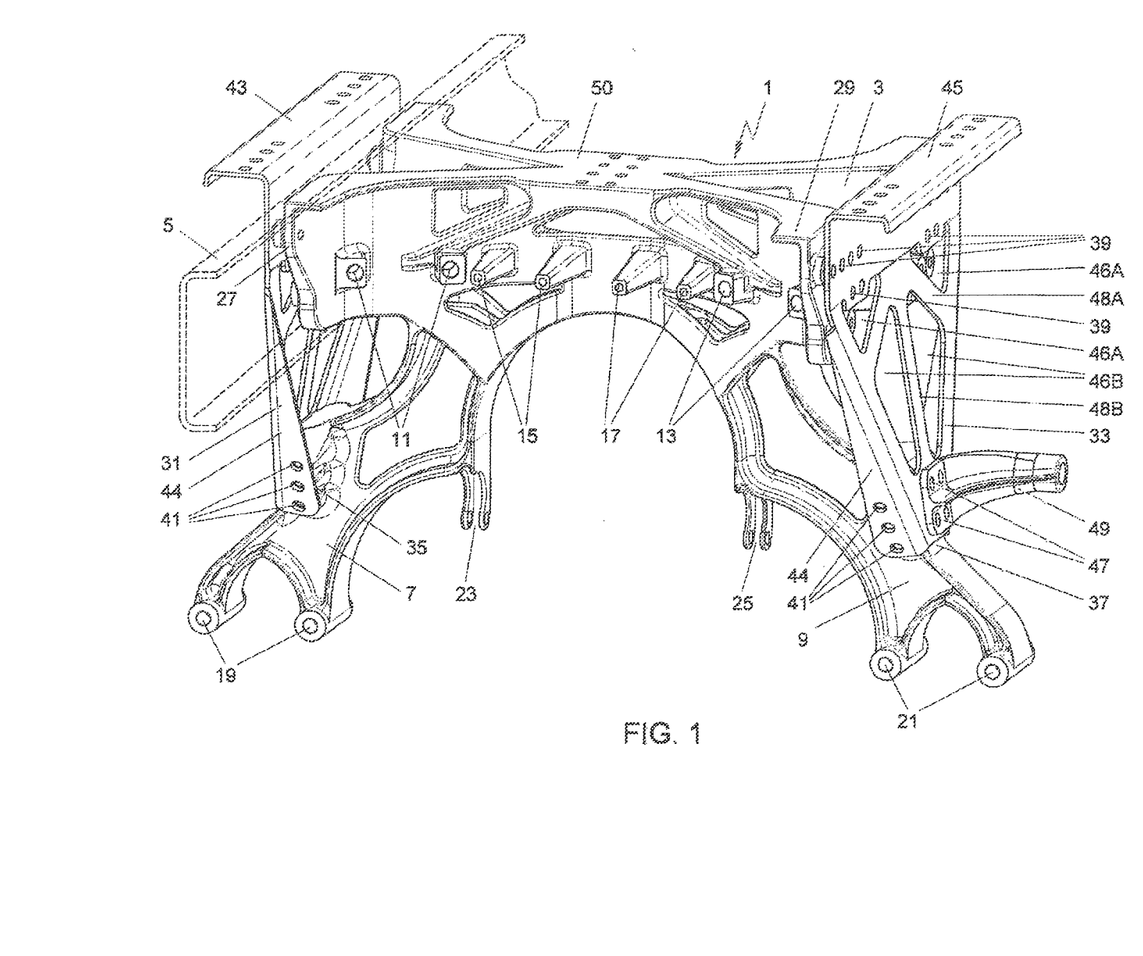
FIG. 1 is an isometric view of a first embodiment of a wheel suspension carrier showing a front side.

In FIG. 1 a combined vehicle frame cross brace and wheel suspension carrier, briefly referred to as wheel suspension carrier 1, is shown. The wheel suspension carrier 1 has a transverse body 3 that is adapted to extend between opposite frame members; of which only a right-hand one having reference numeral 5 is shown in dotted lines.

Depending from the transverse body 3 are a right-hand strut 7 and a left-hand strut 9. The right-hand and left-hand struts 7, 9 are integrally formed with the transverse body 3 as a unitary forging, casting moulding or sintered structure. This unitary structure has first and second pairs of upper suspension linkage anchoring mountings 11, 13 on its transverse body 3. Also integrally formed on the transverse body 3 are first and second pairs of lift arm anchorage mountings 15, 17. The right and left-hand struts 7, 9 are each provided with one of a first and a second pair of radius rod anchoring mountings 19, 21. Inwardly of the first and second pair of radius rod anchoring mountings 19, 21 and downwardly below the first and second pairs of lift arm anchorage mountings 15, 17, the unitary structure further has first and second lift actuator connections 23, 25. On opposite lateral ends the transverse body 3 has right-hand and left-hand mounting flanges 27, 29 for mounting between right-hand 5 and left-hand frame members respectively. Thereby each mounting flange 27, 29 engages the inside web of the relevant frame member. Further it is shown in FIG. 1 that first and second external reinforcement brackets or elements 31, 33 are arranged to extend between a strut area 35, 37 of the right-hand and left-hand struts 7, 9 in the vicinity of the first and second pairs of radius rod anchoring mountings 19, 21 respectively, and the outside of each frame member web. Accordingly the web of the right-hand frame member 5 is sandwiched between the right-hand mounting flange 27 and the first external reinforcement bracket 31. Conversely, the web of the left-hand frame member (not shown, but the mirror image of frame member 5) is sandwiched between the left-hand mounting flange 29 and the second external reinforcement bracket 33. For the purpose of attachment each reinforcement bracket 31, 33 has a series of upper and lower mounting apertures 39, 41 through which bolts may engage (not shown, but conventional). The first and second reinforcement brackets 31, 33 are preferably from high strength sheet steel and each comprise an integrated mounting flange 43, 45 for assisting in the mounting of a fifth wheel trailer saddle coupling. The lower mounting apertures 41 are positioned on inturned flanges 44, which further reinforce the external brackets 31, 33 and form-fit the strut areas 35, 37 in vicinity of the radius rod anchoring points. Further mounting holes 47 may be provided in the strut areas 35, 37 for reinforcing the connection of the external brackets 31, 33 to the struts 7, 9, but also to mount a steering actuator bracket 49 using the same further mounting holes 47. The external reinforcing elements 31, 33, as shown in the drawing figures, may have an open space frame structure defined by triangular openings 46A, 46B, spaced by connecting struts 48A, 48B. This tripod arrangement of connecting struts 48A, 48B is both light and sufficiently stiff and in combination with the inturned flanges 44 avoid buckling. The inturned flanges 44 thereby form concentrations of structural material in the outer edge regions of the generally triangular external reinforcement brackets 31, 33. A central mounting platform 50 on the transverse body 3 may be further useful in the mounting of a trailer coupling. As will be explained further on the flanges 44 along the downwardly converging outer front and rear edges of the reinforcing elements 31 need not necessarily be turned inwardly only. As will become clear the reinforcing (anti-buckling) properties can also be obtained by directing these flanges outwardly. The relevant feature is that these flanges are deflected in a direction perpendicular to a plane through the main web of the reinforcing bracket or element.

Figure 2:
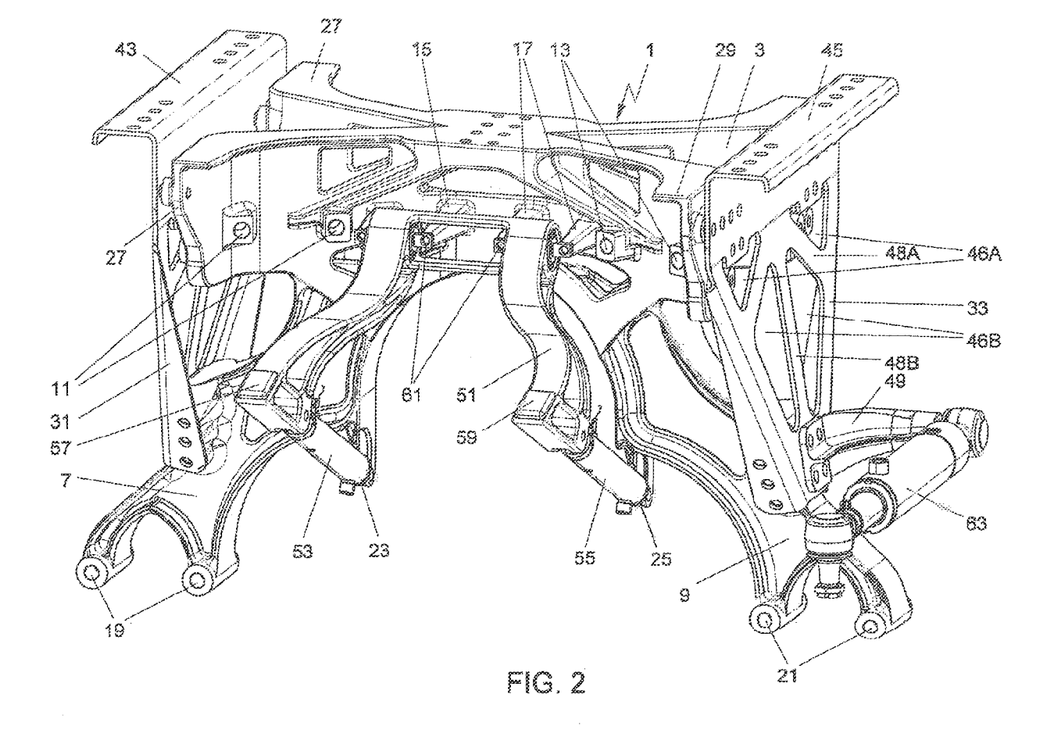
FIG. 2 is a view similar to FIG. 1 of the first embodiment of the wheel suspension carrier with an axle lift mounted and a steering actuator mounted thereto.

Referring now to FIG. 2, it is seen how the wheel suspension carrier and chassis cross member assembly 1, still without the chassis rails being shown, can receive an axle lift arm 51 and axle lift actuators 53, 55. The actuators 53, 55 extend respectively between the first and second lift actuator connections 23, 25 and a relevant distal end 57, 59 of the lift arm 51. The articulations at both ends of the actuators 53, 55 can make use of ball joints, using steel balls. The lift arm 51 is pivotally connected to the first and second pair of lift arm anchorage mountings 15, 17 by elastomeric ball-and-socket joints 61. The ball-and-socket joints 61 can be of a type as disclosed by U.S. Pat. No. 4,129,394, U.S. Pat. No. 584,604 or U.S. Pat. No. 6,719,476, but also of another suitable type. Also mounted to the steering actuator bracket 49 is a steering actuator hydraulic cylinder 63. The articulations on both ends of the steering actuator 63 are preferably steel ball joints to prove a possibly stiff force transmission path.

Figure 3:
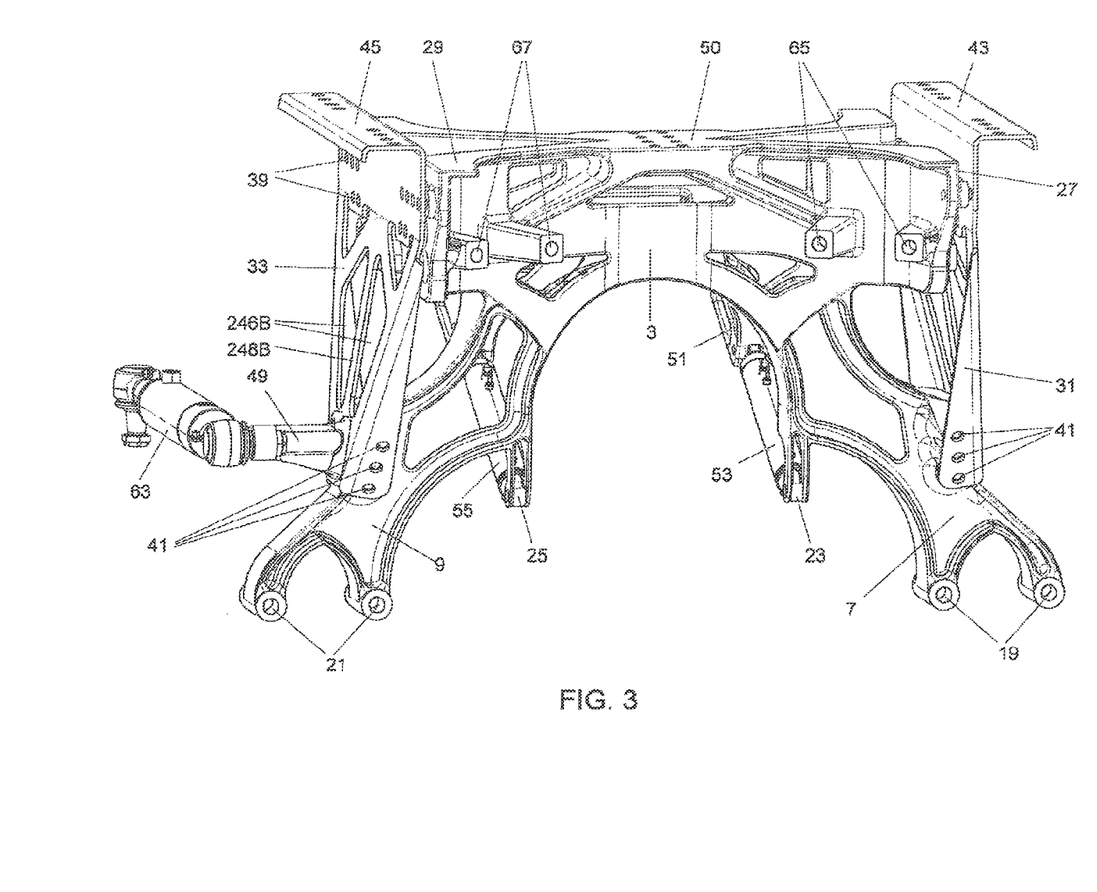
FIG. 3 is an isometric view of the wheel suspension carrier of FIG. 2 showing a rear side thereof.

In FIG. 3 a view from the opposite rear side of the wheel suspension carrier 1 of FIG. 2 is shown. From this view it is apparent that the rear side of the transverse body 3 is provided with third and fourth pairs of upper suspension linkage anchorage mountings 65, 67. The other reference numerals correspond with those already described in reference to FIGS. 1 and 2.

Figure 4:
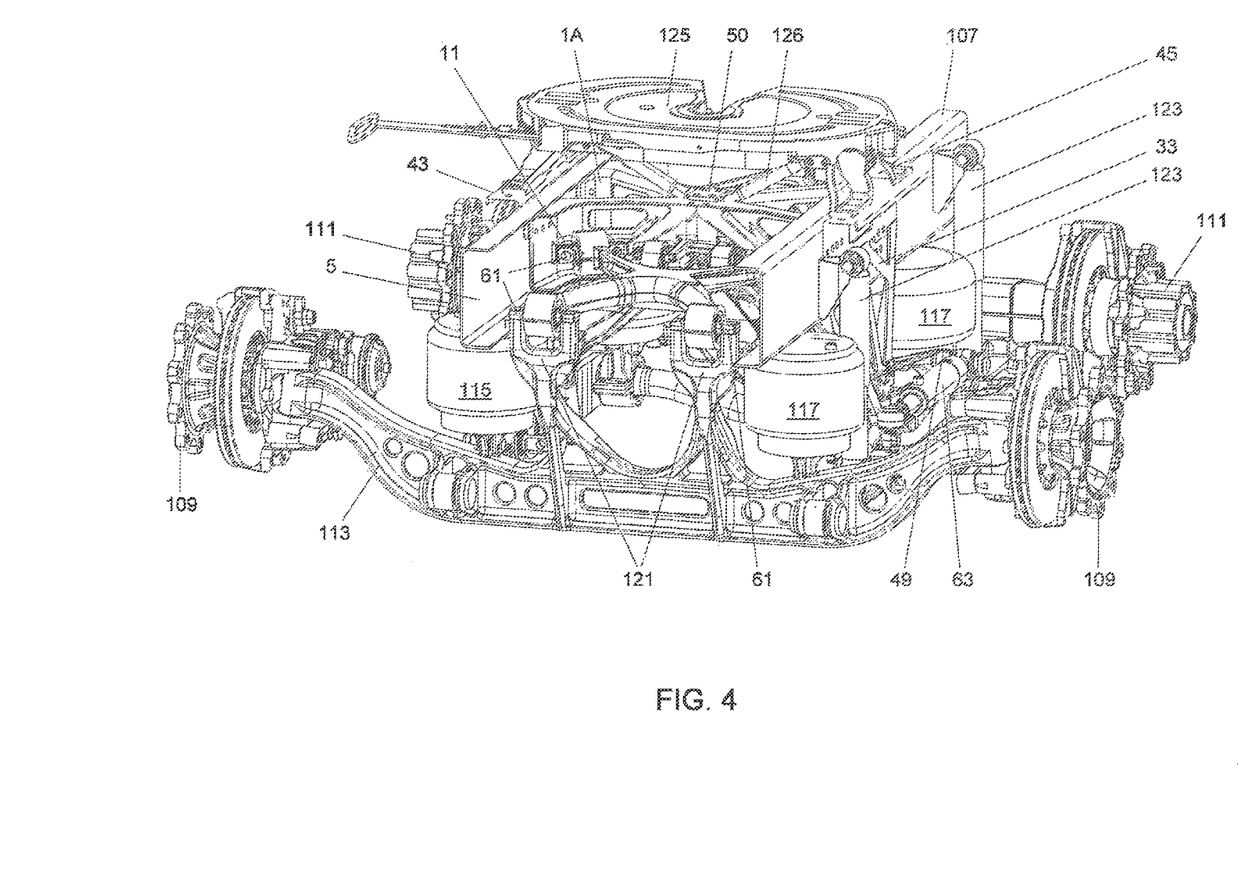
FIG. 4 is an isometric front view of a rear wheel assembly of a freight vehicle tractor incorporating the disclosed wheel suspension carrier.
Figure 5:
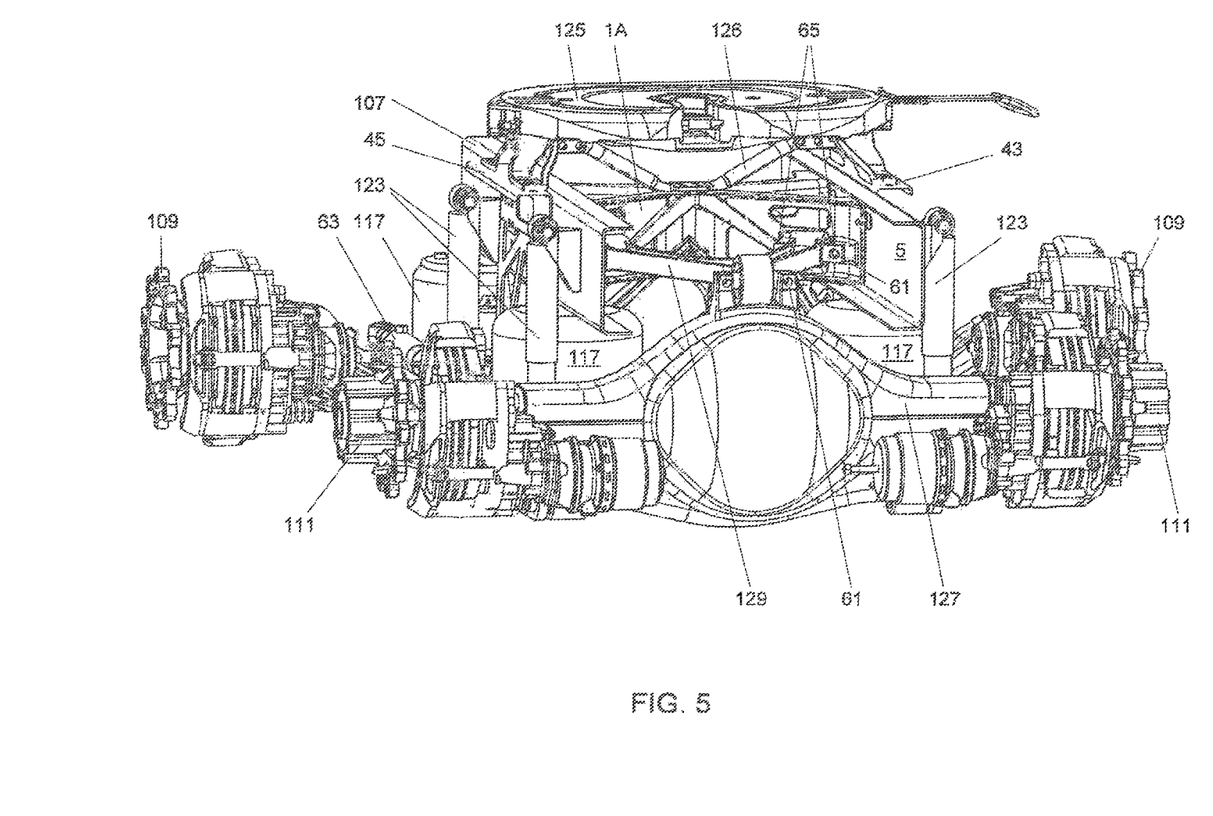
FIG. 5 is an isometric rear view of the rear wheel assembly of FIG. 4.

FIGS. 4 and 5 show the rear wheel assembly of a freight vehicle tractor including a combined vehicle frame cross member and wheel suspension carrier 1A, similar to that disclosed in FIGS. 1-3. In FIG. 4 in an isometric front view a portion of the right-hand frame member 5 and a portion of the left-hand frame member 107 is shown. This portion of a vehicle frame corresponds to a rear end of the chassis, when viewed opposite to the normal driving direction. It should be understood that the right- and left-hand frame members 5, 107 can both extend further forwardly and further rearwardly, but those conventional portions of a freight vehicle are not required for the understanding of the present arrangement which is primarily concerned with the rear wheel suspension of such a vehicle. It is further seen in FIG. 4 that the rear axle assembly has mid or pusher axle hubs 109 and rear axle hubs 111. The mid or pusher axle hubs 109 are each pivotally mounted to a liftable mid or pusher axle 113. The liftable mid or pusher axle 113 is suspended by air bellows 115, 117 and connected by lower radius rods (hidden from view by the mid or pusher axle 113, but generally conventional) to the first and second pairs of radius rod anchoring mountings 19, 21 (see FIGS. 1-3). To control the axle castor and guide its movement, an upper linkage 119 is pivoted to a pair of upstanding axle struts 121 by means of further elastomeric ball-and-socket joints 61. The upper linkage 119 is here in the form of a quadrangle which also resists vehicle roll with respect to the axle 113 in a predetermined amount. The upper linkage 119 is also pivotally mounted to the first and second pairs of upper suspension anchoring mountings 11, 13 by means of further ball-and-socket joints 61. A drive shaft to the rear axle (not shown, but conventional) can extend between the upstanding axle struts 121. The liftable mid or pusher axle 113 is further seen to be provided with telescopic shock absorbers 123, which are mounted in pairs on each side of the suspension air bellows 115, 117. Also clear from FIG. 4 is how the second reinforcing bracket 33 is mounted to the outside surface of the web of the frame member 107. The mounting of first reinforcing bracket 31 to frame member 5 is similar, but hidden from view in FIG. 4. A trailer coupling 125 can be mounted from the mounting flanges 43, 45 integrated with the reinforcing bracket 31, 33. This trailer coupling 125 as shown can be further mounted to central mounting platform 50 of the suspension carrier, using a diagonal cross brace 126. The diagonal cross brace is combined with the transverse body that is also associated with the axle suspension of the tractor or non-articulated truck. In such an arrangement the diagonal bracing is positioned directly between the pivot bearings for the coupling saddle 125 and the chassis traverse, enabling transfer of forces directly to the wheel suspension anchoring points. This mounting arrangement for trailer couplings results in a more weight optimal and less complex construction, with increased torsional stiffness for a tractor or truck chassis.

It is further seen in FIG. 4 that the steering actuator cylinder 63 is connected to the left-hand mid or pusher axle hub 109. When the left-hand and right-hand mid or pusher axle hubs 109 are linked to one another by a track rod (as is conventional in vehicle steering), then only the one actuator cylinder 63 will be required.

Taking reference to FIG. 5, it becomes apparent that the rear hubs 111 are mounted on a driven rear axle 127. The driven rear axle 127 is also suspended by air bellows 117 in conjunction with telescopic shock absorbers 123. The driven rear axle 127 is similarly guided by the wheel suspension carrier 1 as is the liftable mid or pusher axle 113 as described in reference to FIG. 4. This means that the driven rear axle 127 is linked by lower radius rods or radius arms to the first an second pairs of anchoring mountings 19, 21 (see FIG. 3). The lower radius rods or arms (not visible in FIG. 5, but conventional) may be the parallel arms of a so-called "stabilenker", which is also useful in controlling vehicle roll. Guidance of the upper end of the driven axle 127 is taken care of by an upper linkage in the form of triangle 129. The upper triangle 129 is pivotally linked to the upper anchorage mountings 65, 67 (see also FIG. 3) by again elastomeric ball-and-socket joints 61. A similar ball-and-socket joint 61 may be used to pivotally connect an upper end of the rear axle 127 to an apex of the triangle link 129.

Figure 6:
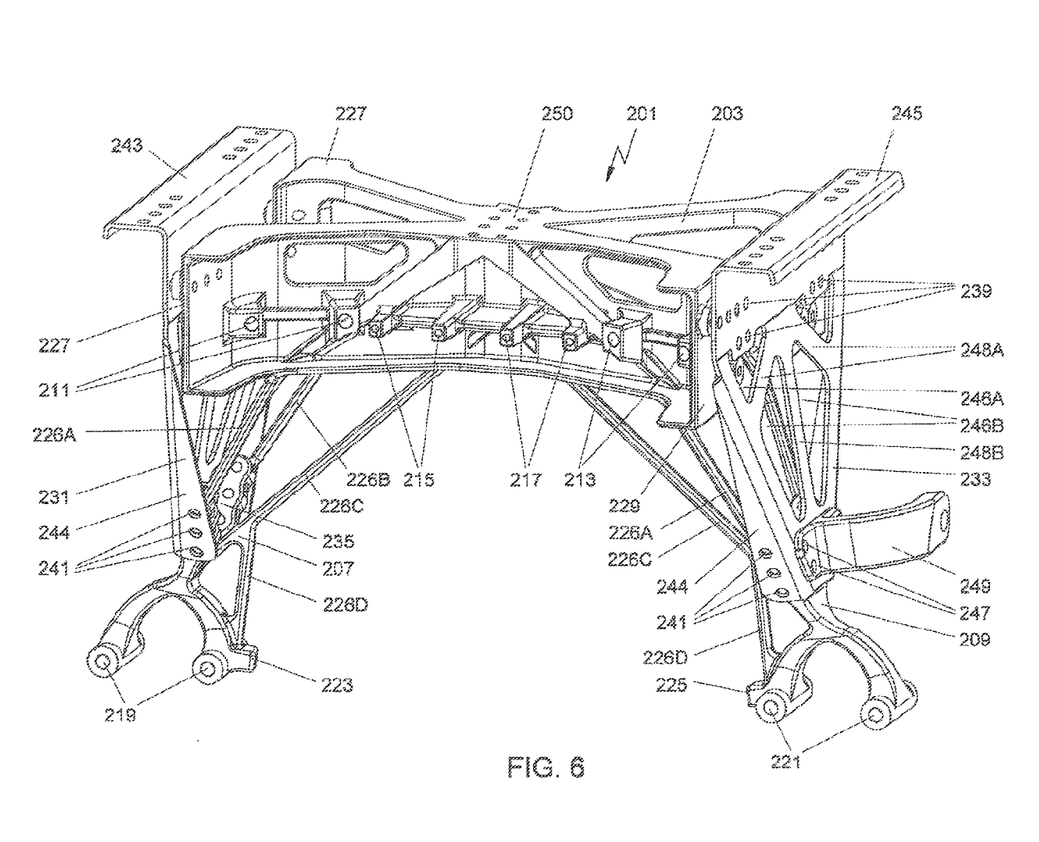
FIG. 6 is an isometric view of a second embodiment of the wheel suspension carrier showing a front side.
Figure 7:
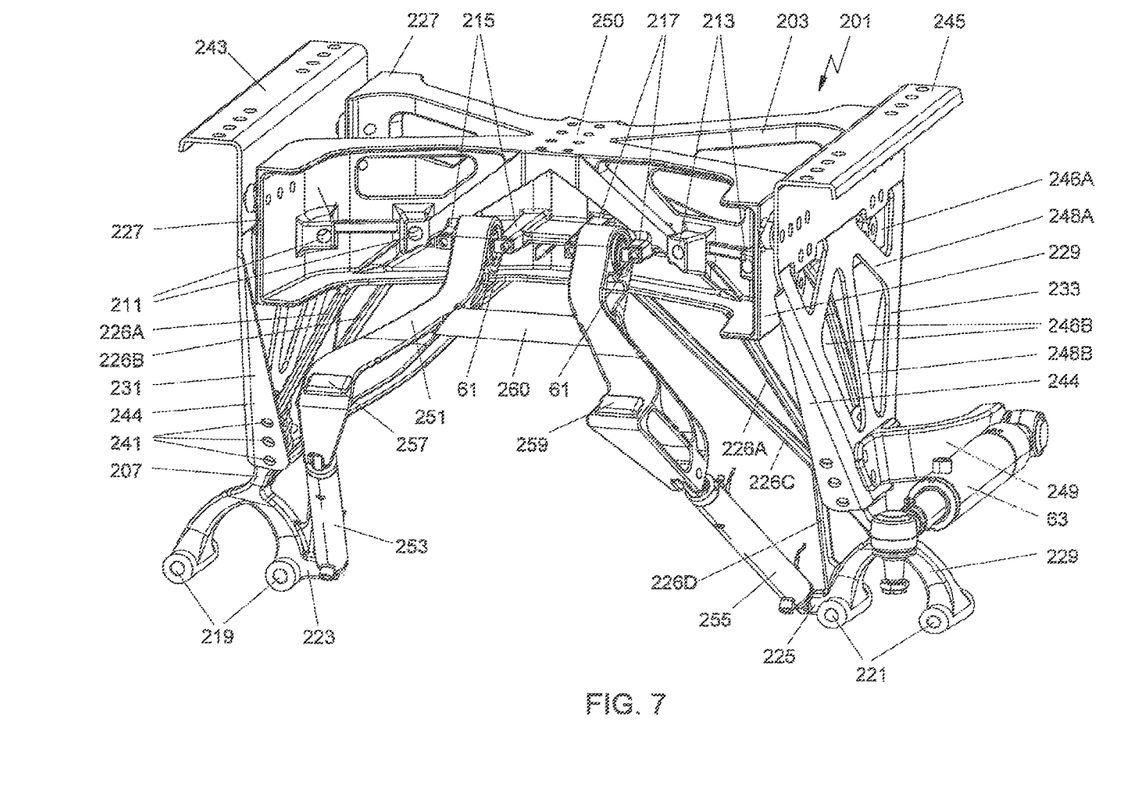
FIG. 7 is a view similar to FIG. 6 of the second embodiment of the wheel suspension carrier with an axle lift and a steering actuator mounted thereto.
Figure 8:
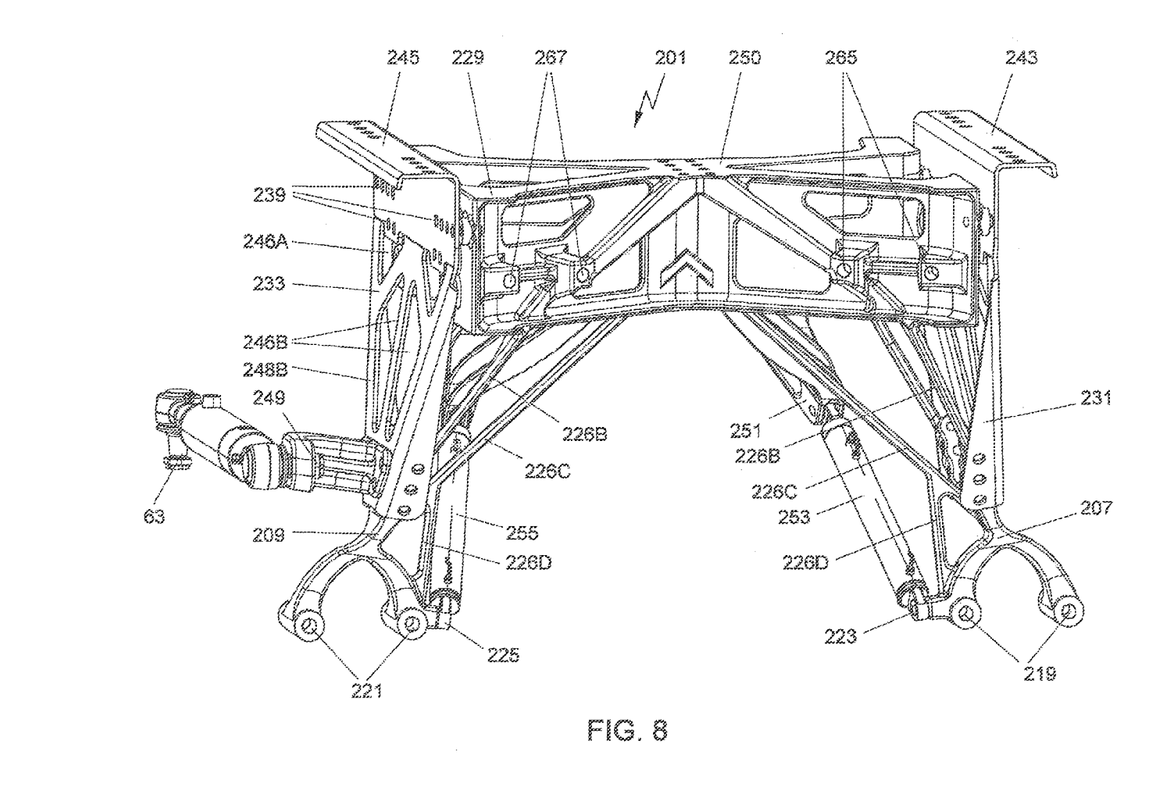
FIG. 8 is an isometric view of the wheel suspension carrier of FIG. 7 showing a rear side thereof.

FIGS. 6, 7 and 8 are views similar to FIGS. 1, 2 and 3 and show a second embodiment of wheel suspension carrier 201. Similar reference numerals to those of the first embodiment, but differing by the addition of a full "200", will be used to denote corresponding elements.

As seen in FIG. 6, the combined frame cross member and wheel suspension carrier 201 has a transverse body 203 and downwardly depending right-hand and left-hand struts 207, 209. The transverse body 203 is again provided with first and second pairs of anchoring mountings 211, 213 for an upper suspension linkage. Inwardly of the first and second pairs of anchorage mounting 211, 213 are first and second pairs of lift arm anchorage mounting 215, 217. At the distal lower ends of the right-hand and left-hand struts, a relevant first pair and a relevant second pair of radius rod anchoring mounting 219, 221 are provided. In this second embodiment, first and second lift actuator connections 223, 225 are located adjacent the first and second pairs of radius rod mountings 219, 221 respectively. It is further seen that in this second embodiment the amount of material of the right- and left-hand struts 207, 209 in comparison to the first embodiment (FIGS. 1-3) has been further reduced. Generally the structural material of the right and left hand struts 207, 209 has been reduced to a plurality of strut formations 226A, 226B, 226C, 226D in a triangular arrangement, as shown in FIGS. 6 to 8. This, amongst others, has become possible by relocating the lift actuator connections 223, 225 to the distal ends of the struts 207, 209. The transverse body 203, which acts as the frame cross member of a vehicle frame, is provided with right- and left-hand mounting flanges 227, 229 for being mounted between the inwardly directed surfaces of frame member webs (not shown in FIGS. 6-8, but conventional). Destined for mounting to the outwardly directed webs of such parallel frame members are first and second external reinforcement brackets 231, 233. As described in reference to the first embodiment, in use, each one of a pair of parallel frame members will be sandwiched between the relevant left- or right-hand mounting flange 227, 229 and a confronting one of the first and second external reinforcement brackets 231, 233. The separate attachment of the reinforcement brackets in the first and in this second embodiment also ensures that production inaccuracies in the vehicle frame can be easily accommodated. A lower end of each of the external reinforcement brackets attaches to a relevant one of the downwardly extending struts 207, 209. For the attachment of the external reinforcement brackets 231, 233 a series of upper mounting apertures 239 and a series of lower mounting apertures 241 is provided. The lower mounting holes 241 provide attachment to connecting areas in the vicinity of a lower distal end of the right and left hand struts 207, 209. One of the strut connecting areas 235 is shown in FIG. 6. Similar to the first embodiment the first and second reinforcement brackets 231, 232 also have their lower mounting apertures 241 positioned on inturned flanges 244, for further reinforcement and form-fitting to the strut areas (such as 235) in vicinity of the radius rod anchoring points. The external reinforcing elements 231, 233, as shown, preferably are provided with an open space frame structure formed by triangular openings 246A, 246B, separated by connecting struts 248A, 248B. The connecting struts 248A, 248B, together with the plurality of strut formations 226A, 226B, 226C, 226D form tripoids. This makes for a light and, in combination with the inturned flanges 244 of the reinforcement brackets 231, 232, sufficiently stiff construction to resist buckling. The inturned flanges 244 thereby concentrate structural material in the outer edge regions of the generally triangularly shaped reinforcement brackets 231, 233. Further lower mounting holes 247 can be combined with the attachment of a steering actuator bracket 249. A central section of the transverse body 203 may serve as a central mounting platform 250 for mounting of a trailer coupling (as shown in FIGS. 4 and 5). Such a trailer coupling will also be mounted on outwardly extending mounting flanges 243, 245 that are integral with the relevant first or second reinforcement bracket 231, 233.

As further seen in FIG. 7 an axle lift arm 251 may be pivotally connected to the first and second pairs of lift arm mountings 215, 217. This pivotal mounting may again be obtained by elastomeric ball-and-socket joints 61, identical to the first embodiment. Axle lift actuator 253, 255 now each extend between the relevant low positioned first and second lift actuator connections 223, 225 and opposite distal ends 257, 259 of the bifurcated lift arm 251. The mid or pusher axle lift arm 251, in contrast to the axle lift arm of the first embodiment, has been given an H-shape, by an intermediate tubular connection 260 between the lift arm ends 257, 259. The thus reinforced axle lift arm 251 has an improved transverse resistance when the lift actuators 253, 255 are not positioned strictly in parallel. The best reinforcement and thereby lightest axle lift arm would clearly be obtained when the intermediate tubular reinforcement connection would extend directly between the opposite distal ends 257, 259, effectively producing an U-shape, but such a position would interfere with the drive shaft. Hence the preference for an H-shape with the tubular reinforcement 260 as close as possible to the distal ends 257, 259 of the axle lift arm 251. Connected to the steering actuator bracket 249 is again a hydraulic steering actuator 63, which is identical to that of the first embodiment.

Turning now to FIG. 8, it is shown that the rear side of the transverse body 203 is again provided with third and fourth pairs of upper suspension linkage anchorage mountings 265, 267.

For the use of the second embodiment of the wheel suspension carrier reference can be had to the description of FIGS. 4 and 5, which show a rear axle assembly incorporating a wheel suspension carrier very similar to the second embodiment.

Figure 9:
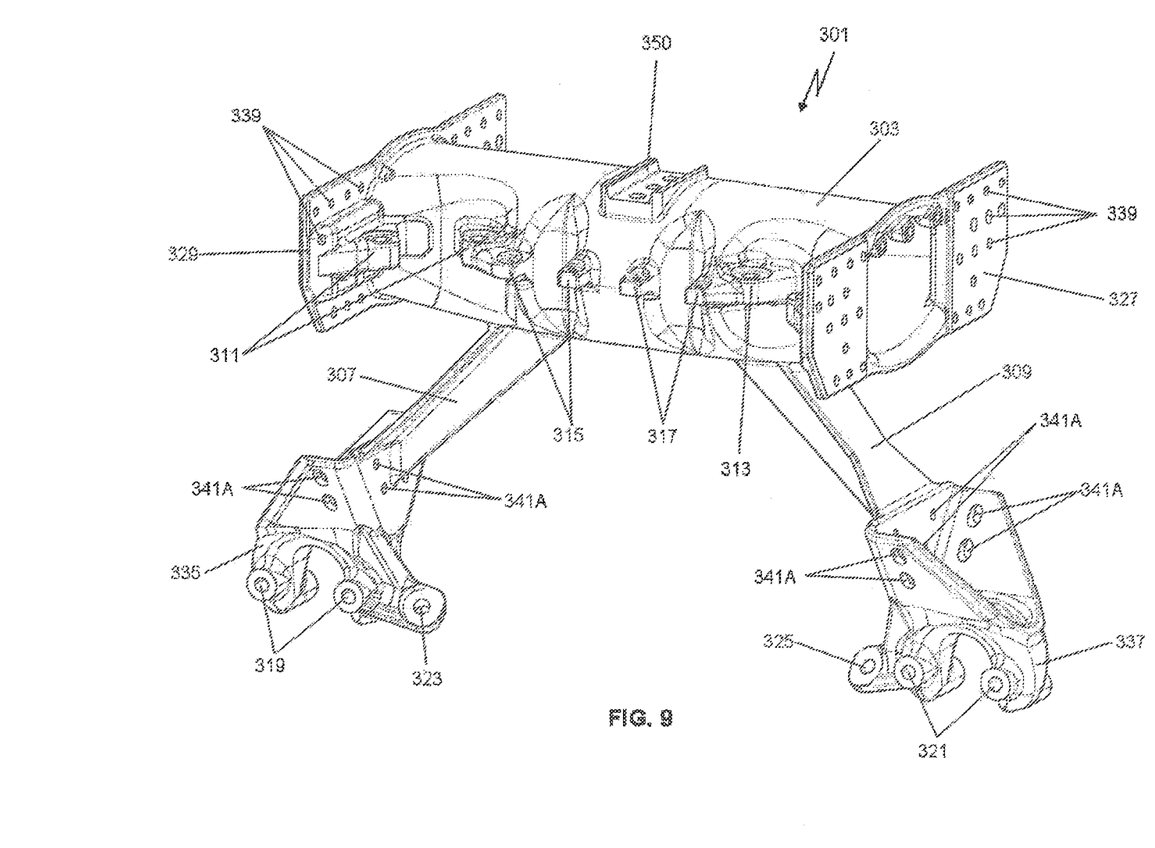
FIG. 9 is an isometric view of a third embodiment of the wheel suspension carrier as viewed from a front side.
Figure 10:
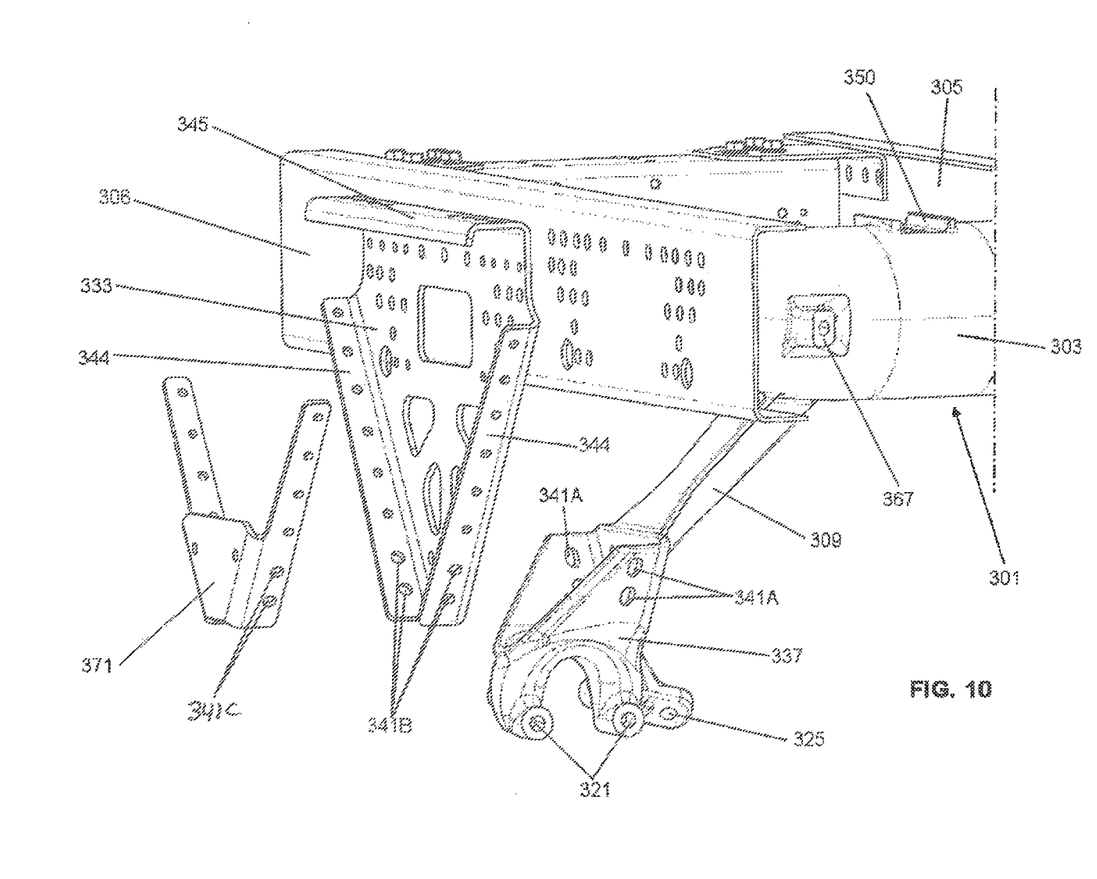
FIG. 10 is an exploded partial view of a rear axle suspension carrier assembly.

A third embodiment of wheel suspension carrier 301 is shown in FIGS. 9 and 10. In this wheel suspension carrier 301 a transverse body 303 is shaped a hollow substantially tubular cross member for mounting between facing inside webs of opposite right-hand and left-hand chassis rails 305, 306 (shown in FIG. 10). To this end the transverse body 303 has opposite first and second mounting flanges 327, 329 with several mounting holes 339. While the substantially tubular transverse body 303 can be generally circular in cross section, it advantageously has a somewhat elliptical cross section, so that it is wider in a fore to aft direction of the vehicle than in a vertical direction. Shaping the transverse body 303 as a hollow element substantially increases the torsional stiffness of a chassis in which it is mounted. At the same time the structural integrity and weight reduction of the combined cross member and suspension carrier 301 is ensured. Right-hand and left-hand struts 307, 309 are extending downwardly and outwardly from the transverse body 303. At a distal end of the right-hand strut 307 is formed a bowl-shaped mounting area 335, which at a lower end includes a first pair of radius rod mountings 319, as well as a first lift actuator connection 323. Similarly the distal end of the left-hand strut 309 has a mounting area 337 with a second pair of radius rod mountings 321 and a second lift actuator connection 325. Also formed integrally with each strut area 335, 337 in vicinity of the radius rod mountings 319, 321 is an outwardly open bowl-shaped section with a plurality of mounting holes 341A. The hollow shape of the transverse body 303 and the bowl-shaped mounting areas 335, 337 result in optimized weight reduction, while retaining and even improving strength and stiffness.

Similar to the previously described embodiments the transverse body 303 has first and second pairs of upper suspension linkage mountings 311, 313, as well as first and second pairs of lift arm pivot mountings 315, 317. Centrally on top of the transverse body 303 a mounting platform 350 may be provided to assist in the mounting of an optional trailer coupling (similar to that shown in FIGS. 4 and 5). As will be apparent from the partial exploded view of FIG. 10, a separately attached external reinforcement element 333 will be attached upon assembly. Thereby the reinforcing element 333 will extend between the mounting area 337 and a location on the outer web of the left-hand chassis rail 306, where the transverse body 303 attaches to the inside web by means of its mounting flange 327. A similar arrangement will be found on the right-hand side of the wheel suspension carrier 301, but this is not shown in the partial view of FIG. 10. The reinforcing element further has outwardly turned flanges 344, which snugly fit into the bowl-shaped mounting area 335. Mounting openings 341B are provided in the flanges 344 to correspond to the mounting holes 341A to receive fasteners (not shown, but conventional). The outwardly turned flanges 344 form concentrations of structural material in the outer edge regions of the generally triangular external reinforcement brackets, such as 333, and prevent buckling. The outwardly turned flanges may further be used for the attachment of shock absorber mounting brackets or additional load distribution brackets. An upper end of the generally triangularly shaped reinforcing element 333 is also provided with a mounting flange 345 for supporting and mounting a trailer coupling. Also visible in FIG. 10 is that a rear side of the transverse body 303 has a fourth pair of upper suspension linkage mountings in an arrangement very similar to the previously described embodiments. A further description of the various anchorage mountings is therefore deemed superfluous for the present embodiment. By having the various anchorage mountings for suspension linkages integrally formed as part of a one-piece unitary forging, unitary casting, unitary moulding, or sintered part, the proper alignment of the suspension components is ensured. In conventional suspension mounting arrangements it has always been a tedious and time consuming job to properly align the various suspension anchorings. A further feature of this third embodiment 301 is an optional insert piece 371 that can be used to connect a bracket for a hydraulic steering actuator on at least one side of the vehicle. Use of the insert piece 371 has the added benefit of additionally strengthening the lower ends of the struts 307, 309 by being bolted or riveted to the lower mounting areas 335, 337 by means of holes 341C.

In comparing the first, second and third embodiments, it is clear that much effort is directed to reducing weight, while not compromising strength and stiffness. Concentrations of material are preferably located there where forces are transferred between the various mounting points. Generally nodal concentrations of material and mounting points are included in an approximately triangular network. To achieve an optimally configured design with respect to weight and sturdiness, fatigue life evaluation under operational conditions has always been a prerequisite, as a majority of the loads are dynamic and not easy to capture solely by calculations. More recently however, it has become possible to computerize interactions between finite elements modelling (FEM) calculations and computer aided design (CAD), while taking into account parameters obtained through field and laboratory testing. These design optimization techniques have greatly reduced the need for additional field testing. Having thus identified the high stress areas, the cross-sectional properties were optimized within the space available for the axle suspension support structure. Even with the assistance of computerized design optimization final adjustments and modifications of the design by human interference are required to ensure manufacturability. Particular characteristics of the improved component design can be obtained by combined computer optimization and human interference. A four stage design process has been found very useful in arriving at the weight saving shape of the combined frame cross member and wheel suspension carrier of the presently disclosed embodiments. In a first step of this design process the dimensional constraints or design space for the integral cross member was defined. In a second step load measurements and data acquisition from stress analysis and life cycle tests were translated into specific loads of the integral cross member. The dimensional boundaries of the first step and the loads of the second step are then subjected to a topological optimization for various load conditions. The third step results in a distribution of material concentrations and material reductions within the dimensional boundaries. The result of the third step is not yet necessarily in a form that is practical for use as an integral cross member and may still lack material concentrations in locations where fasteners need to be used for mechanical connections. Conversely there may be material concentration in locations where it is less practical or desirable to have a dense structure. To eliminate these drawbacks to some extend in a fourth step the topological result of the third step was transformed by computer aided design (CAD) into the practical integral cross member as shown and described here.

A substantial benefit of various cavities and openings in the structural shapes of the first and second embodiments 1, 201 is that in manufacturing a more equal distribution of wall thicknesses is obtained. A possible equal wall thickness may be a prerequisite when the carrier 1, 201 is obtained as a casting, but may also be favourable in forging, moulding or sintering operations. While casting in ductile or spherical graphite cast iron is an attractive manufacturing option for the combined cross member carrier 1, 201, also forgings in steel or light alloy and powder metallurgy in sintered structures are not to be excluded as possible alternatives. Good results however can be obtained with castings in a GGG50 material.

While the support structure may integrally be formed as one of a one-piece forging, a one-piece casting, a one-piece moulding and a one-piece sintered part, it is alternatively possible for it to be compiled from individual elements that may be bolted together. The support structure according to such an alternative can be divided in mirrored or non-mirrored left hand and right hand parts for connection to the respective left and right chassis frame sides. These separate left and right vehicle side parts can then be connected together by means of an intermediate section. This intermediate section, if so desired, can be of a non-casted material, such as plate material. With such a separate intermediate section, vehicle width variations can easily be accommodated. Such an alternative arrangement can also have economical advantages.

Accordingly a support assembly for receiving a vehicle wheel suspension and adapted for mounting to a vehicle structure, is disclosed that includes: a transverse body 3, 203, 303 having opposite ends; a left hand anchoring strut 9, 209, 309 extending downwardly from the transverse body 3, 203, 303 to define a distal left hand lower end; a right hand anchoring strut 7, 207, 307 extending downwardly from the transverse body 3, 203, 303 to define a distal right hand lower end. The transverse body 3, 203, 303, the left hand anchoring strut 9, 209, 309, and the right hand anchoring strut 7, 207, 307 are preferably, but not necessarily, integrally formed as one of a unitary forging, a unitary casting, a unitary moulding and a unitary sintered component. Separately attached left hand and right hand external reinforcing elements 31, 33; 231, 233, 303 each extend from an adjacent one of the opposite ends of the transverse body 3, 203, 303 to a connecting area 35, 37; 235, 335, 337 adjacent the respective one of the left and right hand distal lower ends of the downwardly extending anchoring struts 7, 9; 207, 209, 307, 309. Each of the first and second external reinforcing elements 31, 33; 231, 233, 333 has a substantially planar main web with downwardly extending outer front end rear edges. At least one of the front and rear edges has a flange 44, 244, 344 deflected in a direction perpendicular to a plane coextensive the substantially planar main web.

Optionally it is preferred for the support assembly that the transverse body on a rear face thereof includes third and fourth pairs of upper suspension linkage anchorage mountings. It is also preferred for the transverse body on a front face thereof to include first and second pairs of upper suspension linkage anchoring mountings. Additionally or optionally it is preferred that the lower distal ends of the left and right hand struts include one of a first and second pair of radius rod anchoring mountings.

According to another optional preference each of the first and second external reinforcing elements may be lightened by windows, so as to form a triangular space frame structure. Again optionally, but very advantageous, all of the transverse body, the left hand anchoring strut, and the right hand anchoring strut can be integrally formed as one of a unitary forging, a unitary casting, a unitary moulding and a unitary sintered component.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

The invention claimed is:

1. Support assembly for receiving a vehicle wheel suspension and adapted for mounting to a vehicle structure, the support assembly including:
   a transverse body having opposite ends;
   a left hand anchoring strut extending downwardly from the transverse body to define a distal left hand lower end; and
   a right hand anchoring strut extending downwardly from the transverse body to define a distal right hand lower end, wherein separately attached left hand and right hand external reinforcing elements are each extending from adjacent ones of the opposite ends of the transverse body to respective connecting areas adjacent the respective ones of the distal left hand lower end and distal right hand lower end of the downwardly extending anchoring struts,
wherein each of the left hand and right hand external reinforcing elements includes an upper outwardly extending mounting flange for mounting of a trailer coupling.

2. Support assembly according to claim 1, wherein the transverse body on a front face thereof includes first and second pairs of upper suspension linkage anchoring mountings.

3. Support assembly according to claim 2, wherein the transverse body on a rear face thereof includes third and fourth pairs of upper suspension linkage anchorage mountings.

4. Support assembly according to claim 1, wherein lower distal ends of the left and right hand struts include one of a first and second pair of radius rod anchoring mountings.

5. Support assembly according to claim 1, wherein the transverse body on a front face thereof includes first and second pairs of lift arm anchorage mountings.

6. Support assembly according to claim 5, wherein the right and left hand struts each include one of a first and second lift actuator connection.

7. Support assembly according to claim 6, further including an axle lift arm articulated from the first and second pairs of lift arm anchorage mountings and at least one axle lift actuator arranged between one of the first and second lift arm connections and a distal end of the axle lift arm.

8. Support assembly according to claim 1, wherein the transverse body is a hollow substantially tubular element.

9. Support assembly according to claim 1, wherein the transverse body includes a central mounting platform for mounting a trailer coupling cross brace.

10. Support assembly according to claim 1, wherein each of the left hand and right hand external reinforcing elements has been lightened by windows, so as to form a triangular space frame structure.

11. Support assembly according to claim 10, wherein the triangular space frame structure is defined by triangular openings separated by connecting struts, which together with a plurality of strut formations of the right and left hand struts are in a tripod arrangement.

12. Supporting assembly according to claim 11, wherein each of the left hand and right hand external reinforcing elements has a generally triangular outline with downwardly converging front end rear outer edges each having outwardly turned flanges.

13. Supporting assembly according to claim 12, wherein an additional insert piece is attached to a lower end of at least one of the external reinforcing elements for mounting of a hydraulic steering actuator and/or for additionally strengthening the lower ends of the relevant left and right hand struts.

14. Supporting assembly according to claim 1, wherein the transverse body, the left hand anchoring strut, and the right hand anchoring strut being integrally formed as one of a unitary forging, a unitary casting, a unitary moulding and a unitary sintered component.

15. Support assembly according to claim 1, wherein the connecting area of one of the downwardly extending anchoring struts is associated with a steering actuator bracket.

16. Tractor vehicle for towing semi-trailers including the support assembly of claim 1.

17. Tractor vehicle according to claim 16, further including right hand and left hand frame members, a rear axle, a liftable mid or pusher axle, and upper suspension linkages.

18. Tractor vehicle according to claim 17, wherein the upper suspension linkage that guides the liftable mid or pusher axle is a quadrangle, and wherein the upper suspension linkage that guides the rear axle is a triangle.

19. Kit of parts for providing the support assembly of claim 1.

20. Supporting assembly for receiving a vehicle wheel suspension and adapted for mounting to a vehicle structure, the support assembly including:
   a transverse body having opposite ends;
   a left hand anchoring strut extending downwardly from the transverse body to define a distal left hand lower end; and
   a right hand anchoring strut extending downwardly from the transverse body to define a distal right hand lower end, wherein separately attached left hand and right hand external reinforcing elements are each extending from adjacent ones of the opposite ends of the transverse body to respective connecting areas adjacent the respective ones of the distal left hand lower end and distal right hand lower end of the downwardly extending anchoring struts,
wherein each of the left hand and right hand external reinforcing elements has a substantially planar main web with downwardly extending front and rear edges, at least one of the front and rear edges has a flange deflected in a direction perpendicular to a plane coextensive with the substantially planar main web.

21. Supporting assembly according to claim 20, wherein each of the left hand and right hand external reinforcing elements has a generally triangular outline with downwardly converging front end rear outer edges each having inwardly turned flanges.

22. Supporting element according to claim 20, wherein the at least one deflected flange is in form-fitting engagement with a strut in the vicinity of radius rod anchoring mountings.

* * * * *